United States Patent
Venkatraman et al.

(10) Patent No.: US 11,086,749 B2
(45) Date of Patent: Aug. 10, 2021

(54) DYNAMICALLY UPDATING DEVICE HEALTH SCORES AND WEIGHTING FACTORS

(71) Applicant: International Business Machines Corporation, Armonk, NY (US)

(72) Inventors: Dinesh G. Venkatraman, Bangalore (IN); Hariharan N. Venkitachalam, Bengaluru (IN); Alankar Srivastava, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/528,868

(22) Filed: Aug. 1, 2019

(65) Prior Publication Data
US 2021/0034495 A1 Feb. 4, 2021

(51) Int. Cl.
*G06F 11/00* (2006.01)
*G06F 11/34* (2006.01)
*G06F 11/30* (2006.01)

(52) U.S. Cl.
CPC ...... *G06F 11/3447* (2013.01); *G06F 11/3024* (2013.01); *G06F 11/3409* (2013.01); *G06F 11/3476* (2013.01)

(58) Field of Classification Search
CPC ............. G06F 11/3024; G06F 11/3409; G06F 11/3447; G06F 11/3476
See application file for complete search history.

(56) References Cited

U.S. PATENT DOCUMENTS

| 6,192,325 | B1 | 2/2001 | Piety et al. |
| 7,124,059 | B2 | 10/2006 | Wetzer et al. |
| 7,681,195 | B2 | 3/2010 | Boss et al. |
| 8,006,116 | B1 * | 8/2011 | Sobel .................. G06F 11/0706 714/1 |
| 9,886,338 | B1 * | 2/2018 | Khokhar ................. G06F 11/34 |
| 10,248,114 | B2 * | 4/2019 | Hilemon ........... G06F 16/24578 |
| 10,963,325 | B2 * | 3/2021 | Coutinho .......... G06F 16/24578 |

(Continued)

OTHER PUBLICATIONS

IBM, "IBM Predictive Maintenance and Optimization", IBM Marketplace, printed May 29, 2019, 3 pages https://www.ibm.com/in-en/marketplace/ibm-predictive-maintenance-optimization.

(Continued)

*Primary Examiner* — Joshua P Lottich
(74) *Attorney, Agent, or Firm* — Daniel M. Yeates (57) ABSTRACT

Disclosed is a computer implemented method to adjust device health weighting factors, the method comprising, determine a set of monitored devices including a first monitored device. The method comprises, determining a set of parameters, wherein each parameter is associated with one operating metric of each of the monitored devices. The method comprises, receiving a set of usage data, including a usage history for each parameter. The method further comprises, performing trend analysis on the set of usage data configured to identify a relative influence of each parameter on the set of monitored devices. The method also comprises, generating a set of weighting factors based on the trend analysis, and wherein each parameter in the set of parameters is associated with a weighting factor, and calculating a health score for the first monitored device, wherein the calculation is based on the set of weighting factors.

20 Claims, 6 Drawing Sheets

(56) References Cited

U.S. PATENT DOCUMENTS

| | | |
|---|---|---|
| 2011/0137697 A1 | 6/2011 | Yedatore et al. |
| 2013/0268229 A1 | 10/2013 | Gleeson, III et al. |
| 2015/0142506 A1* | 5/2015 | Kumar ................ G06Q 10/0635 |
| | | 705/7.28 |
| 2015/0309908 A1* | 10/2015 | Pearson .............. G06F 11/3006 |
| | | 714/57 |
| 2016/0306675 A1* | 10/2016 | Wiggers ................ G06F 9/4856 |
| 2016/0330223 A1 | 11/2016 | Sridhara et al. |
| 2016/0378615 A1* | 12/2016 | Cohen ................. G06F 11/3055 |
| | | 714/19 |
| 2017/0021503 A1 | 1/2017 | Kuffner, Jr. et al. |
| 2017/0364792 A1 | 12/2017 | Chai et al. |
| 2019/0003929 A1* | 1/2019 | Shapiro .............. G05B 23/0275 |
| 2019/0121685 A1* | 4/2019 | Coutinho ............ G06F 11/3452 |
| 2019/0138964 A1* | 5/2019 | Morita ................. G06F 16/353 |
| 2019/0286539 A1* | 9/2019 | Gerossie, Jr. ....... H04L 61/6022 |
| 2019/0340094 A1* | 11/2019 | Lu ....................... G06F 11/3447 |
| 2020/0186435 A1* | 6/2020 | Hardy .................. G06T 11/206 |

OTHER PUBLICATIONS

Mell et al., "The NIST Definition of Cloud Computing", Recommendations of the National Institute of Standards and Technology, Sep. 2011, U.S. Department of Commerce, 7 pages.

\* cited by examiner

DYNAMICALLY UPDATING DEVICE HEALTH SCORES AND WEIGHTING FACTORS

BACKGROUND

The present disclosure relates to monitoring computing devices, and, more specifically, to monitoring the health of a plurality of devices.

Modern computing devices are deployed in a continuously changing paradigm. There are new hardware, software, security threats, standards, etc. being developed, released, and implemented into existing systems. In some instances, the new or updated products can cause a drag on productivity and/or slow performance of the existing system.

SUMMARY

Disclosed is a computer implemented method to adjust device health weighting factors, the method comprising, determining a set of monitored devices, wherein the set of monitored devices includes a first monitored device. The method also includes, determining a set of parameters, wherein each parameter is associated with one operating metric of each of the set of monitored devices. The method comprises, receiving a set of usage data, wherein the set of usage data includes a usage history for said each parameter. The method further comprises, performing trend analysis on the set of usage data, wherein the trend analysis is configured to identify a relative influence of said each parameter on the set of monitored devices. The method also comprises, generating a set of weighting factors, wherein the weighting factors are based on the trend analysis, and wherein each parameter in the set of parameters is associated with a weighting factor in the set of weighting factors, and calculating a health score for the first monitored device, wherein the calculation is based on the set of weighting factors. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. The present disclosure is not limited to the particular embodiments described. On the contrary, the disclosure covers all modifications, equivalents, and alternatives falling within the spirit and scope of the present disclosure.

DETAILED DESCRIPTION

Aspects of the present disclosure relate to monitoring computing devices, and, more specifically, to monitoring the health of a plurality of devices. Aspects of the present disclosure may be better appreciated in light of the aforementioned applications.

Modern computing devices are deployed in a continuously changing paradigm. New hardware, software, security threats, standards, etc. are continuously developed, released, and implemented into existing systems. In some instances, the new or updated products can slow performance on some systems, becoming a detriment to user productivity. This can have a significant impact on the total cost of ownership. When a single entity owns hundreds or thousands of devices, that cost is compounded.

Embodiments of the present disclosure take into consideration the need to monitor the health of devices to determine when and what changes should be made, and when/if a device should be replaced. The health of a computing device is a measure of efficiency and/or productivity. Accurately and objectively monitoring and tracking the health of computing devices can assist in lowering the cost total cost of ownership. For example, if a device is healthy, it can be extended beyond the initial replacement date, thereby saving the time and expense of updating the device. Or, if two devices are nearing their end of life, but the budget only allows for replacing a single device, the healthier of the two can be maintained and the less healthy device replaced.

Embodiments of the present disclosure include a device health manager. The device health manager can monitor and track performance and/or health of computing devices.

Embodiments of the present disclosure use device attributes to determine the health of the device. Typically, each parameter is assigned a coefficient or weighted coefficient in an overall health calculation. In some embodiments, the weighting factors are driven by manual updates of static values.

Embodiments of the present disclosure categorize the devices based on permanent physical characteristics (e.g., brand, model number, manufacturer, etc.), updatable/alterable characteristics (e.g., operating system, graphic card, network card, software versions, etc.) that influence the health (e.g., efficiency, latency, down time, security/vulnerability, etc.) of the device.

Embodiments of the present disclosure can perform analytics on the devices. The analytics can include monitoring and recording historical data, especially before and after changes to one or more characteristics (e.g., a software update). The system can then determine a health effect on the device based on the change and apply those findings to future changes on the device, or to changes on other devices.

Embodiments of the present disclosure can run trend analytics on historical data to find insights into the relative influence of device metrics on the health of the device. These insights can be used to recalibrate weighting factors and gather a better representation of the device's health compared to static metrics.

The aforementioned advantages are example advantages, and embodiments exist that can contain all, some, or none of the aforementioned advantages while remaining within the spirit and scope of the present disclosure.

Figure 1:
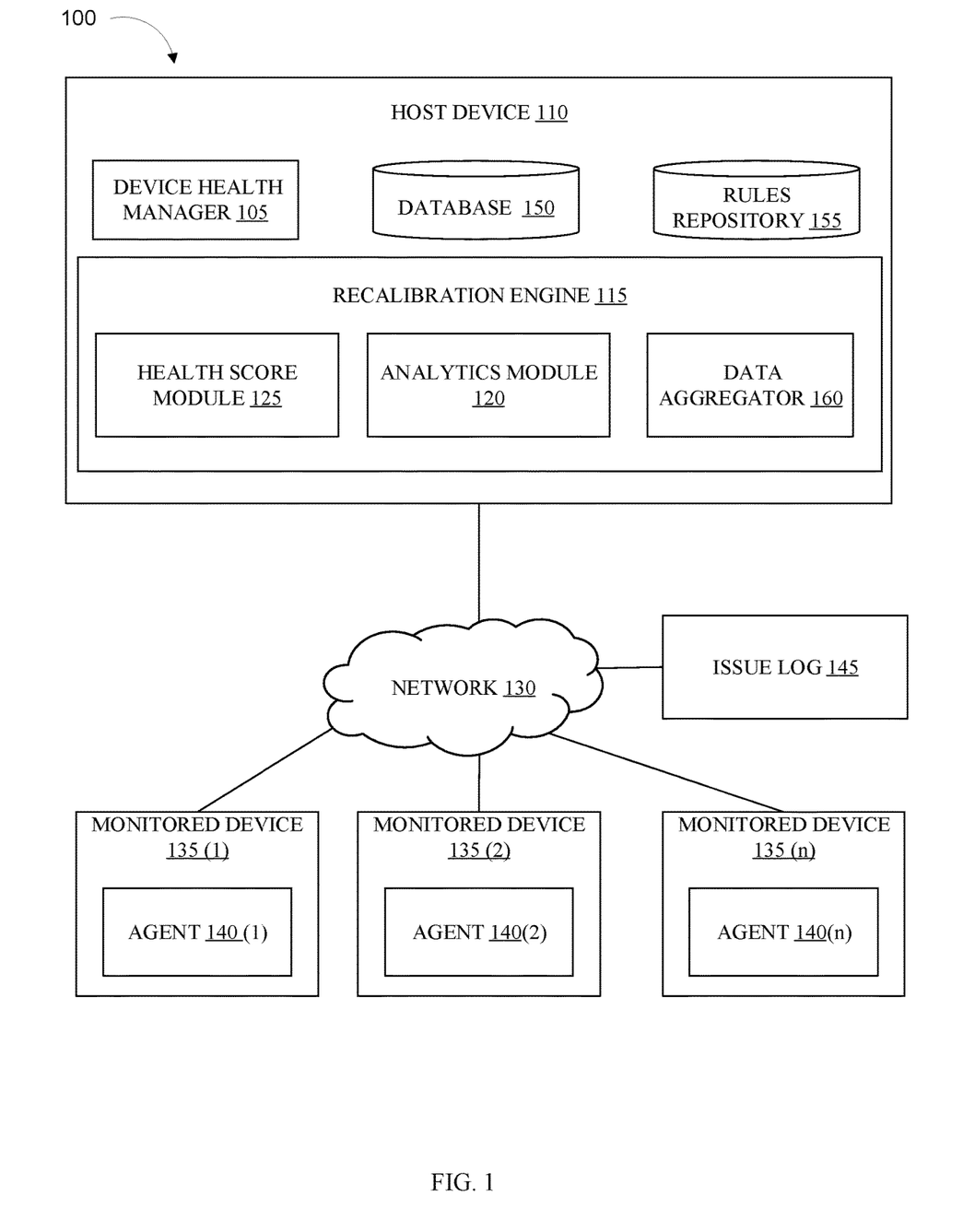
FIG. 1 is a functional diagram that illustrates a computing environment suitable for operation of device health manager, in accordance with some embodiments of the present disclosure.

Referring now to various embodiments of the disclosure in more detail, FIG. 1 is a representation of a computing environment 100, that is capable of running a device health manager 105, in accordance with one or more embodiments of the present disclosure. Many modifications to the depicted environment may be made by those skilled in the art without departing from the scope of the disclosure as recited by the claims.

Computing environment 100 includes host device 110, network 130, monitored devices 135, and issue log 145. Network 130 can be, for example, a telecommunications network, a local area network (LAN), a wide area network (WAN), such as the Internet, or a combination of the three, and can include wired, wireless, or fiber optic connections. Network 125 may include one or more wired and/or wireless networks that are capable of receiving and transmitting data, voice, and/or video signals, including multimedia signals that include voice, data, and video information. In general, network 130 may be any combination of connections and protocols that will support communications between host device 110, includes host device 110, monitored devices 135, issue reporting system 145, and other computing devices (not shown) within computing environment 100.

Host device 110 can be a standalone computing device, a management server, a web server, a mobile computing device, or any other electronic device or computing system capable of receiving, sending, and processing data. In other embodiments, host device 110 can represent a server computing system utilizing multiple computers as a server system, such as in a cloud computing environment. In some embodiments, host device 110 represents a computing system utilizing clustered computers and components (e.g., database server computers, application server computers, etc.) that act as a single pool of seamless resources when accessed within computing environment 100. In some embodiments, host device 110 includes device health manager 105, recalibration engine 115, database 150, and rules repository 155.

Recalibration engine 115 can be any combination of hardware and/or software configured to monitor and calculate device health based on the device performance. In some embodiments, recalibration engine 115 manages the analysis of the data and the health score calculation. For example, recalibration engine 115 can perform or direct subcomponents to gather, sort, and aggregate relevant data. It can perform the analytics (e.g., regression), update and/or calculate weighting factors. Recalibration engine 115 may determine which parameters to monitor and/or analyze, and send results to database 150 and/or rules repository 155. It may also oversee the calculations and enforce the standards in rules repository 155. In some embodiments, recalibration engine 115 can include health score module 125, analytics module 120, and data aggregator 160.

Analytics module 120 can be any combination of hardware and/or software configured to analyze weight parameters based on operating efficiency of one or more devices (e.g., monitored devices 135). In some embodiments, analytics module 120 analyzes data related to performance of one or more computing devices (e.g., monitored devices 135). In some embodiments, analytics module 120 uses one or more regression models to identify and quantify trends in computing devices.

In some embodiments, analytics module 120 uses trend analysis to calculate weighting factors. Trend analysis may include utilizing one or more regression models. Regression is a process used to estimate the relationship among variables. Generally, a dependent variable against one or more independent variables. In some embodiments, analytics module 120 uses one or more of linear regression, simple regression, polynomial regression general linear model, binomial regression, binary regression, nonlinear regression and other models. In various embodiment, analytics module 120 analyzes any one of the parameters, including health, against one or more different parameters. Then, analytics module 120 combines multiple analysis together to create/update weighting factors for each of the parameters. In some embodiments, analytics module 120 uses current weighting factors as a starting point and adjust based on the outcome. In some embodiments, analytics module 120 creates new weighting factors. Said different, current/existing weighting factors may or may not be used as an input to the trend analysis.

In some embodiments, analytics module 120 performs the same or a similar analysis for each monitored device 135 and/or each set of monitored devices 135. In some embodiments, analytics module 120 sends and/or receives data to analyze from data aggregator 160, database 150, issue log system 145, monitored devices 135, and/or other locations within computing environment 100.

Health score module 125 can be any combination of hardware and/or software configured to calculate health scores. In some embodiments, the scores are calculated based on data produced by analytics module 120, and/or data stored in data aggregator 160, database 150 and/or rules repository 155. In various embodiments, health score module 125 calculates a health score, determines which parameters to use, and/or applies rules to the calculation. Health score module 125 can perform its various functions in any order.

In some embodiments, health score module 125 determines a set of parameters. The set of parameters can be those used in the calculation, or the set of parameters that will be analyzed by analytics module 120. The set of parameters can use any number of available parameters and can be the same or different when applied to multiple monitored devices (e.g. monitored devices 135). The set of parameters can include one or more of device type, manufacturer, model, operating system, processor utilization (CPU utilization), disk utilization, memory usage, patch upgrades, software installed, card types (e.g. graphic cards, etc.), primary purpose (e.g., server, employee use, etc.), and/or other similar categories.

In some embodiments, health score module 125 calculates a health score. The calculation can be based on the weighting factors determined by analytics module 120. In some embodiments, the health score is calculated as $H=x*A+y*B+z*C$, where H is an overall health score, x, y, and z, represent weighting factors, and A, B and C represent parameters. In various embodiments, there may be more or less parameters used. In some embodiments, the equation may be modified based on the results of analytics module. Weighting factors can be any numbers, but generally will be between zero and one. In some embodiments, the sum of all weighting factors adds up to 1 (e.g., x=0.5, y=0.3, and z=0.2). This normalizes the health scores calculated with the weighting factors. If an analysis shows parameter A has twice the effect on health than parameter B, the weighting factor x will be twice as large as weighting factor y. In some embodiments, a weighting factor can be 0. The numbers used for parameters can be instantaneous (e.g., CPU utilization at time of error) or average utilization (e.g., average CPU utilization over a period of time). In some embodiments, each parameter is included in the set of parameters.

Database 150 can be any combination of hardware and/or software configured to store historical data for device health manager 105. Historical data can include data received from issue log 145, monitored devices 235, and/or agents 140. Historical data may also include previous results of analytics module 120 and previous/current weighting factors and health scores for monitored devices 135.

Data aggregator 160 can be any combination of hardware and/or software configured to organize data into a form where it can be effectively analyzed by analytics module 120. In some embodiments, data aggregator 160 retrieves/receives data from database 150, issue log 145, monitored devices 135, and/or agents 140.

In some embodiments, data aggregator 160 organizes the data based on parameters. For example, if device health manager 105 instructs recalibration engine 115 to recalculate weighting factors for all devices of a specific manufacturer and model, data aggregator 160 can gather and sort all the relevant data, and then send it to analytics module 120 or other subsequent processes.

Rules repository 155 can be any combination of hardware and/or software configured to store rules to determine how and when recalibration engine performs its various functions. In some embodiments, the rules in rules repository 155 can be manually updated by a user. The rules may indicate which parameters should be included in health score calculations. For example, one rule can say every health calculation must include CPU utilization with a weighting factor greater than or equal to 0.1. Or another rule can say that the overall health equation must include at least three weighting factors greater than 0.05.

In some embodiments, rules repository 155 dictates how often device agents 140 and/or issue log 145 send data to device health manager 105. For example, one rule can dictate weighting factors will be recalculated every week, and/or after a predetermined amount of issues (e.g., six system crashes, etc.) occur. In some embodiments, rules repository 155 includes a user configurable policy. The policy can contain rules about high/low setpoints/thresholds relating to device health, and actions to take if the setpoints/thresholds are passed. One rule may dictate recalculation upon demand.

In various embodiments, device health manager 105 includes recalibration engine 115, database 150, and/or rules repository 155.

Monitored devices 135 can be a standalone computing device, a management server, a web server, a mobile computing device, or any other electronic device or computing system capable of receiving, sending, and processing data. In some embodiments, monitored devices 135 includes monitored device 135(1), monitored device 135(2), up to monitored device 135(n), where n is an integer, collectively referred to as monitored devices 135. In some embodiments, each of monitored devices 135 includes an agent 140.

In some embodiments, each of monitored devices 135 (e.g., monitored device 135 (2)) may be a single device. In some embodiments, each of monitored devices 135 includes a plurality of unique devices. In these embodiments each of the plurality of unique devices have at least one attribute in common and may have all attributes in common. For example, monitored device 135(4) can be all devices that have the same manufacturer, model, and operating system. Alternatively, monitored device 135(4) could be all devices that run the same operating system, and/or a single device.

Device agents 140 can be any combination of hardware and/or software configured to monitor and record usage data of monitored devices 135. In some embodiments, device agents 140 includes device agent 140(1), device agent 140(2), up to device agent 140(n), where n is an integer index, collectively referred to as device agents 140. In some embodiments, agents 140 monitor, record, and/or store activity and patterns on their associated monitored devices 135. Agents 140 can continuously monitor and record, or intermittently monitor and record. In some embodiments, agents 140 continuously stream data to device health manager 105. In some embodiments, agents 140 send batches of aggregated data to device health manager 105.

Issue log system 145 can be one more computing device configured to receive and record issues from monitored devices 135. An issue can be performance issues, crashes (e.g., system crash, software crash, card crash, etc.), display issues and other similar issues. In some embodiments, reports are sent to issue log 145 automatically. For example, each time a crash occurs agent 140(1) will generate and send a report.

In some embodiments, reports are sent to issue log 145 by a user, and/or manually input. In some embodiments, issue log 145 includes data received by a service desk (e.g., Remedy®, ServiceNow®, etc.). In some embodiments, data in issue log 145 is sent through a natural language processor. The natural language processor can analyze the text and extract data usable by device health manager 105. In some embodiments, Watson Natural Language Understanding® is used as the natural language processor.

Figure 2:
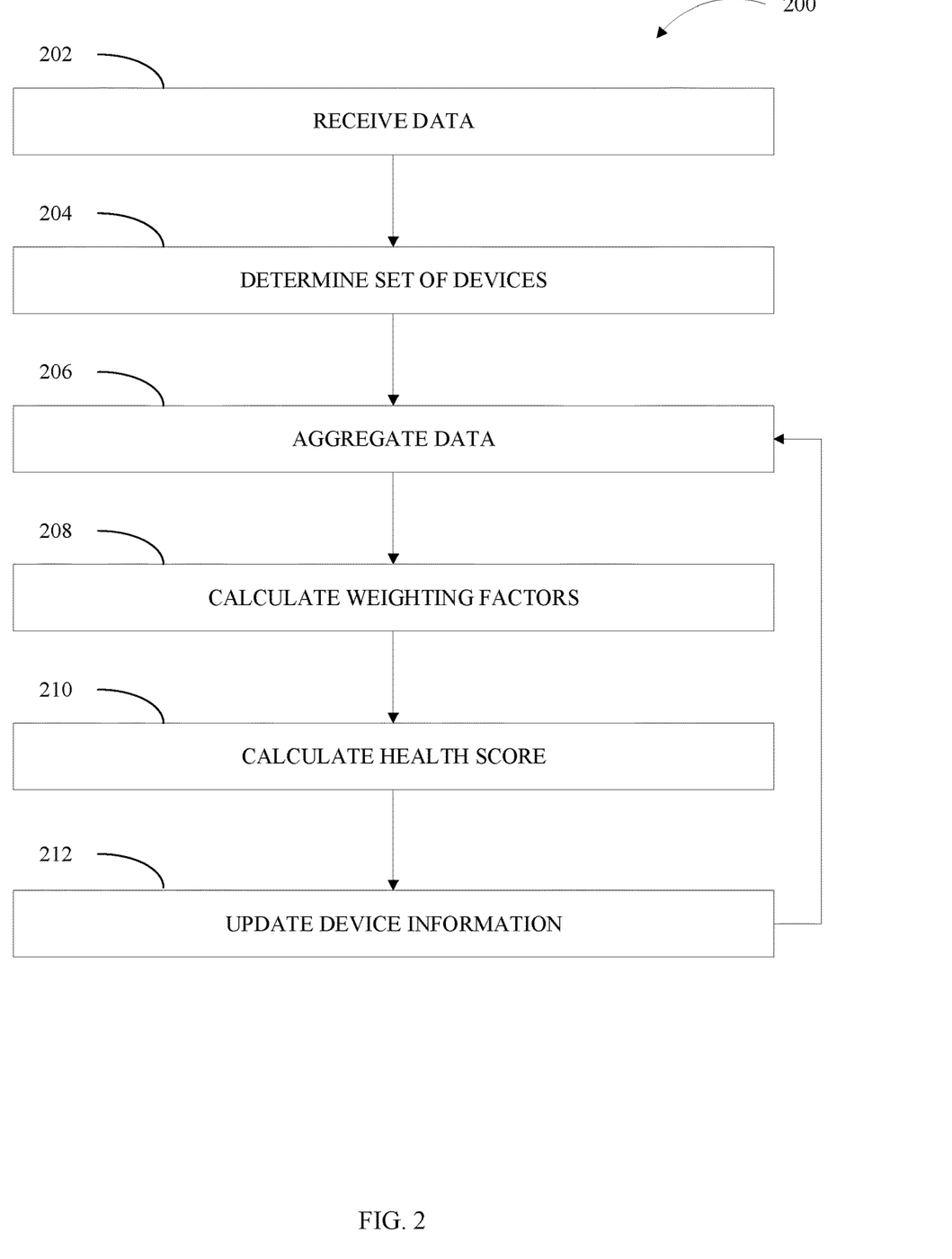
FIG. 2 illustrates an example method to update weighting factors, in accordance with some embodiments of the present disclosure.

FIG. 2 depicts a flowchart of an example method, method 200, of device health manager 105 calculating a health score for a device that can be performed in computing environment 100. One or more of the advantages and improvements described above for updating health score weighting parameters can be realized by the method 200, consistent with various embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a device health manager (e.g., device health manager 105 of FIG. 1), a computing device (e.g., host device 110 of FIG. 1), or a different combination of hardware and/or software. In various embodiments, the various operations of method 200 are performed by one or more of device health manager 105, host device 110, recalibration engine 115, health score module 125, analytics module 120, and/or data aggregator 160.

At operation 202, device health manager 105 receives data. In some embodiments, the received data is usage data. In some embodiments, the data is received from agent 140. In some embodiments, the data is received from monitored device 135. The data can be continuously received, and/or received in batches. A batch can be a set of data for one or more devices that covers a specified period of time (e.g., 1 day, 1 week, etc.). Batches allow the data to be transferred over network 130 when there is less bandwidth use and/or less CPU demand from the device sending data.

In some embodiments, the data is received from issue log 145. In these embodiments, the data can be sent after a specified period of time, after a certain number of logs, and/or any other similar parameters.

In some embodiments, usage data includes usage history for each parameter. For example, some parameters (e.g., disk utilization) vary during machine usage. The usage history may include all data, an average, and/or a portion of the data. In some embodiments, agents 140 record parameters at predefined intervals (e.g., every 3 seconds) and/or calculate a running average over a predefined period of time (e.g., 3 hours).

At operation 204 device health manager 105 determines a set of devices to analyze. In some embodiments, the set of devices includes one or more of monitored devices 135. The set of devices can be determined based on one or more rules in rules repository 155. In some embodiments, the set of devices can be all devices with similar characteristics and/or attributes. Each device in the set of devices can have one or more attributes in common (e.g., all devices that run on a specified operating system, or all devices manufactured by the same company). The set of devices can be based on a predefined number of issues occurring. For example, if a set of devices of a specific model have five similar issues, the set of devices will be all machines of that model. In some embodiments, the set of devices includes all of monitored devices 135.

At operation 206 device health manager 105 aggregates the data. In some embodiments, the data is aggregated by recalibration engine 115. In some embodiments, the data is aggregated by data aggregator 160. Aggregating the data includes filtering out irrelevant data sorting the data that is to be analyzed. In some embodiments, the data is aggregated based on the results of operation 204. For example, any data that is not relevant to the set of devices can be filtered out. In some embodiments, aggregating the data includes grouping devices with similar characteristics and/or attributes.

At operation 208, device health manager 105 calculates weighting factors. In some embodiments, the weighting factors are calculated by recalibration engine 115. In some embodiments, the weighting factors are calculated by analytics module 120. In some embodiments, the weighting factors are calculated based on trend analysis. Trend analysis can include analyzing the various parameters of monitored devices and correlating parameters with performance and/or issues. In some embodiments, the trend analysis uses one or more regression models (e.g., linear regression, polynomial regression, etc.). For example, each time an issue occurs, the current parameters can be recorded. Then the analysis can identify issues that are correlated with certain conditions.

At operation 210, device health manager 105 calculates a health score. In some embodiments, the health score is calculated by recalibration engine 115. In some embodiments, the health score is calculated by health score module 125. The health score can be calculated using $H=x*A+y*B+z*C$, and/or other similar equations. For example, there can be more or fewer parameters used in the equation, and the relationships may be linear or non-linear. In some embodiments, the equation used is based on the results of operation 208. In some embodiments, the health score is calculated by monitored device 135.

In some embodiments, calculating a health score includes determining which set of parameters to include in the calculation. In various embodiments, the number of parameters used is above minimum, below a maximum, or both. The maximum and minimum used can be stored in rules repository 155. In some embodiments, a specific parameter is included in every equation (e.g., CPU utilization). This can be implemented as a rule in rules repository 155.

In some embodiments, the health score is represented by a number between 0 and 100. Any score above 75 may indicate a device is in excellent health. Any score below 25 may indicate a device is in poor health. In some embodiments, rules repository includes a value that indicates a high threshold and/or a low threshold.

At operation 212, device health manager 105 updates the device information. In some embodiments, updating device information includes updating all the information for all devices that were analyzed. This may include storing the results of the analysis in database 150. It may also include an indication that a subsequent analysis should be performed or need not be performed. For example, if the health of a device is declining faster than expected, is approaching a low threshold, and/or appears anomalous, additional analysis may be performed. Additionally, if the health of a device is increasing and/or is declining slower than expected subsequent analysis may be skipped to save computing resources and/or spend those resources on lower health machines.

In some embodiments, updating device information includes changing the end of life determinations for the device. The end of life determination can be extended or shortened. In some embodiments, updating device information includes recommending specific application(s) be updated, installed, and/or removed to increase device health. In some embodiments, updating device information includes repurposing the device.

In some embodiments, operation 212 includes providing an alert, based on the health score. The alert may be provided to a maintenance entity. The alert may be sent when the health score is above and/or below a predetermined threshold (e.g., setpoint). In various embodiments, the alert can be a visual display (e.g., on a monitor of host device 110), and audio alert, or any other type of alert. The alert may be acted upon automatically (e.g., by software), or as needed (e.g., when a user views the alert).

In some embodiments, operation 212 includes providing the health score to a maintenance system. The maintenance system can be software and/or human operated system. The maintenance system may be configured to add and/or remove tasks related to the device from a schedule. For example, if a device is scheduled to be replaced, then the health score is above a threshold, the task of replacing the device can be removed from the maintenance system schedule.

In some embodiments, device health manager 105 returns to operation 206 in response to completing operation 212. In these embodiments, device health manager 105 continuously and/or periodically recalculates/updates the weighing factor and/or health scores for the devices. It may act as a continuous feedback loop. Device health manager 105 may include new data and/or events as it is gathered and aggregated into the existing data set. This may allow the system to quickly determine when there is a change in the health of one or more devices.

Figure 3:
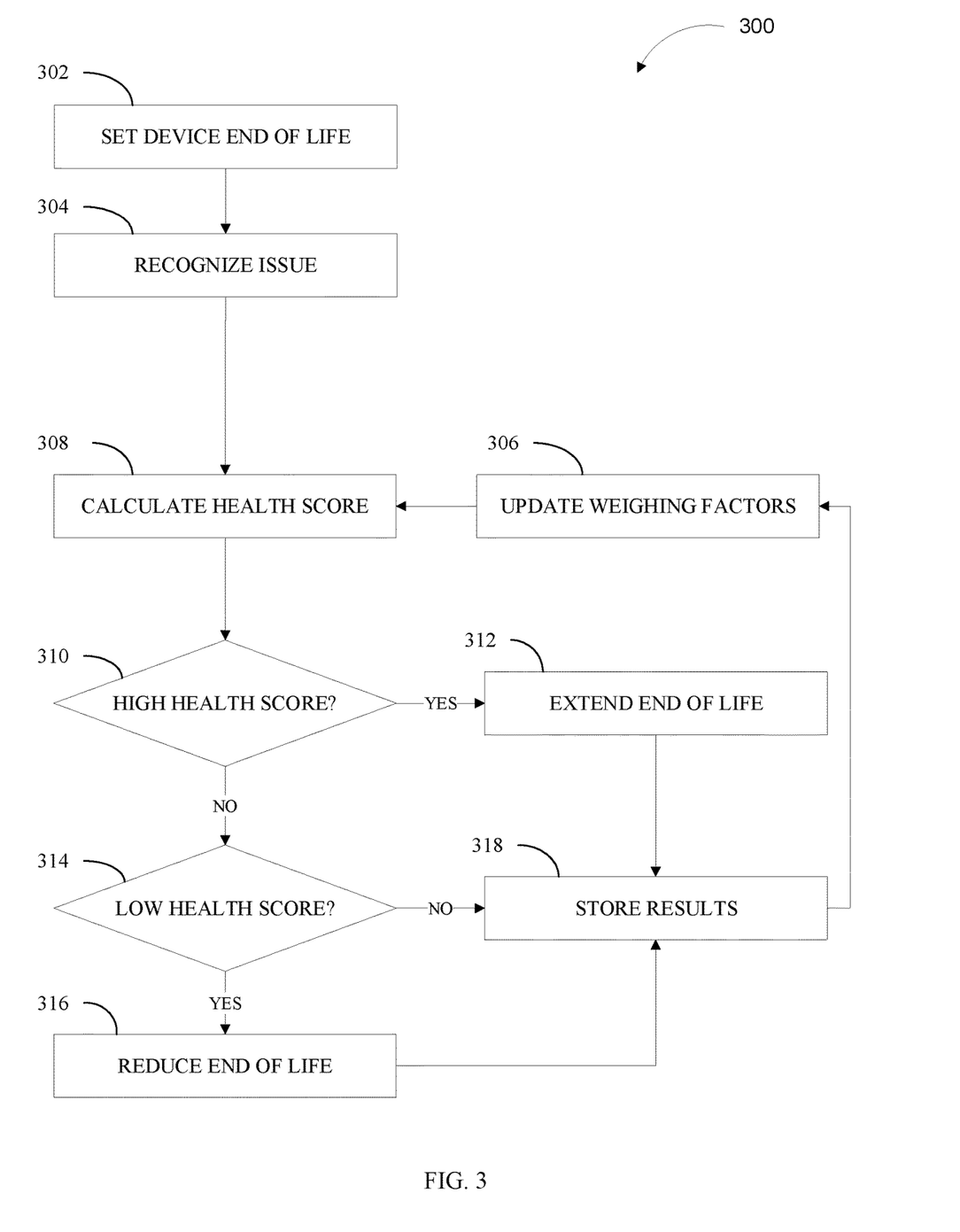
FIG. 3 illustrates an example method to update weighting factors, in accordance with some embodiments of the preset disclosure.

FIG. 3 depicts a flowchart of an example method, method 300, of device health manager 105 altering the end of life of a device based on updated weighting factors that can be performed in a computing environment 100. One or more of the advantages and improvements described above for updating health score weighting parameters can be realized by the method 300, consistent with various embodiments of the present disclosure.

Method 300 can include more or fewer operations than those depicted. Method 300 can include operations in different orders than the order depicted. Likewise, the method 300 can include operations that occur simultaneously rather than sequentially. Many modifications to the depicted method may be made by those skilled in the art without departing from the spirit and scope of the present disclosure. Method 300 can be implemented by one or more processors, a device health manager (e.g., device health manager 105 of FIG. 1), a computing device (e.g., host device 110 of FIG. 1), or a different combination of hardware and/or software. In various embodiments, the various operations of method 300 are performed by one or more of device health manager 105, host device 110, recalibration engine 115, health score module 125, analytics module 120, and/or data aggregator 160.

At operation 302, device health manager 105 sets an end of live for a device. In some embodiments, the device includes a plurality of devices having at least one common parameter. The end of life can be a future date (e.g., Mar. 25, 2020), based on total use time (e.g. 10,000 hours), and/or other similar factors. The initial end of life can be predetermined by the manufacturer, and/or company policy. In some embodiments, the end of life is a set period of time (e.g. 3 years in the future) defined by rules repository 155. However, the predetermined period may be altered by a user.

At operation 304, device health manager 105 recognizes an issue with the device. In some embodiments, the issue is recognized based on data stored in issue log 145 (e.g., user reported). In some embodiments, the issue is recognized by agent 140.

At operation 308, device health manager 105 calculates a health score for the device. In various embodiments, operation 308 is consistent with operations 202 through 210 of FIG. 2. In some embodiments, device health manager 105 uses instantaneous data at the time of the issue update the weighting factors. For example, if the issue is a graphics card crash, CPU utilization, disk utilization, and memory utilization at the time of the crash can be used in the data set. This will allow determination of specific factors that lead to issues and can be incorporated into future weighting factors.

At operation 310, device health manager 105 determines if the device has a high health score. A high health score is any score above a predetermined threshold (a high setpoint). In some embodiments, the predetermined threshold is configurable. It can be unique for each device. For example, monitored device 135(1) can have a high setpoint of 75 and monitored device 135(2) can have a high setpoint of 80. The predetermined threshold can be based on one or more attributes. For example, any devices manufactured by company A may have a high setpoint of 70, and any devices manufactured by company B may have a high set point of 75. The various threshold may be stored in rules repository 155.

If the device has a high health score (310: YES), device health manager 105 proceeds to operation 312. If the device does not have a high health score (decision tree "NO" branch), device health manager 105 proceeds to operation 314.

At operation 312, device health manager 105 extends the determined device's end of life (e.g., replacement date, or update date). Extending the device's end of life can mean the device will not be automatically replaced/retired at that time, but that some other determinations or calculations may be made. The end of life can be extended based on the health score compared against the high setpoint. In some embodiments, extending the end of life includes sending an alert to a maintenance entity.

Extending the life of a device is one option that may be performed in response to having a high health score. In various embodiments, operation 312 includes changing the frequency of analysis, changing the use of the device, installing (or not installing) a software, etc. In some embodiments, the end of life is not changed, while other actions are performed at operation 312.

At operation 314, device health manager 105 determines if the device has a low health score. A low health score is any score below a predetermined threshold (a low setpoint). In some embodiments, predetermined threshold is configurable. The predetermined threshold can be unique for each device (or set of devices). For example, monitored device 135(1) can have a low setpoint of 25 and monitored device 135(2) can have a low setpoint of 20. The predetermined threshold can be based on one or more attributes. For example, any devices manufactured by company A may have a low setpoint of 10, and any devices manufactured by company B may have a low set point of 15. The various threshold may be stored in rules repository 155.

If the device has a low health score (decision tree "YES" branch), device health manager 105 proceeds to operation 316. If the device does not have a low health score (decision tree "NO" branch), device health manager 105 proceeds to operation 318.

At operation 316, device health manager 105 reduces the device's end of life. Reducing the device's end of life can mean the device will be replaced/retired at a time sooner than the previous end of life. In some embodiments, reducing the end of life includes sending an alert to a maintenance entity. The end of life can be reduced based on the health score compared against the low setpoint.

Reducing the life of a device is one option that may be performed in response to having a low health score. In various embodiments, operation 316 includes changing the frequency of analysis, changing the use of the device, installing (or not installing) a software etc. In some embodiments, the end of life is not changed, while other actions are performed at operation 316.

In some embodiments, the predetermined thresholds (both high setpoints and low setpoints) can be relative to the start of life and/or the end of life of a device. For example, if a device is approaching or past its initial end of life, the current health score to replace a device (e.g. low setpoint of 40), may be higher than the original score (e.g. low setpoint of 10) required to replace the device.

At operation 318, device health manager 105 stores the results of the analysis. In some embodiments, operation 318 can be consistent with operation 212 of FIG. 2. In some embodiments, the results are stored in database 150.

At operation 306 device health manager 105 updates weighting factors for the device. In some embodiments, operation 306 is consistent with operation 208 and 210 of FIG. 2. In some embodiments, device health manager 105 returns to operation 308 in response to completing operation 306.

Figure 4:
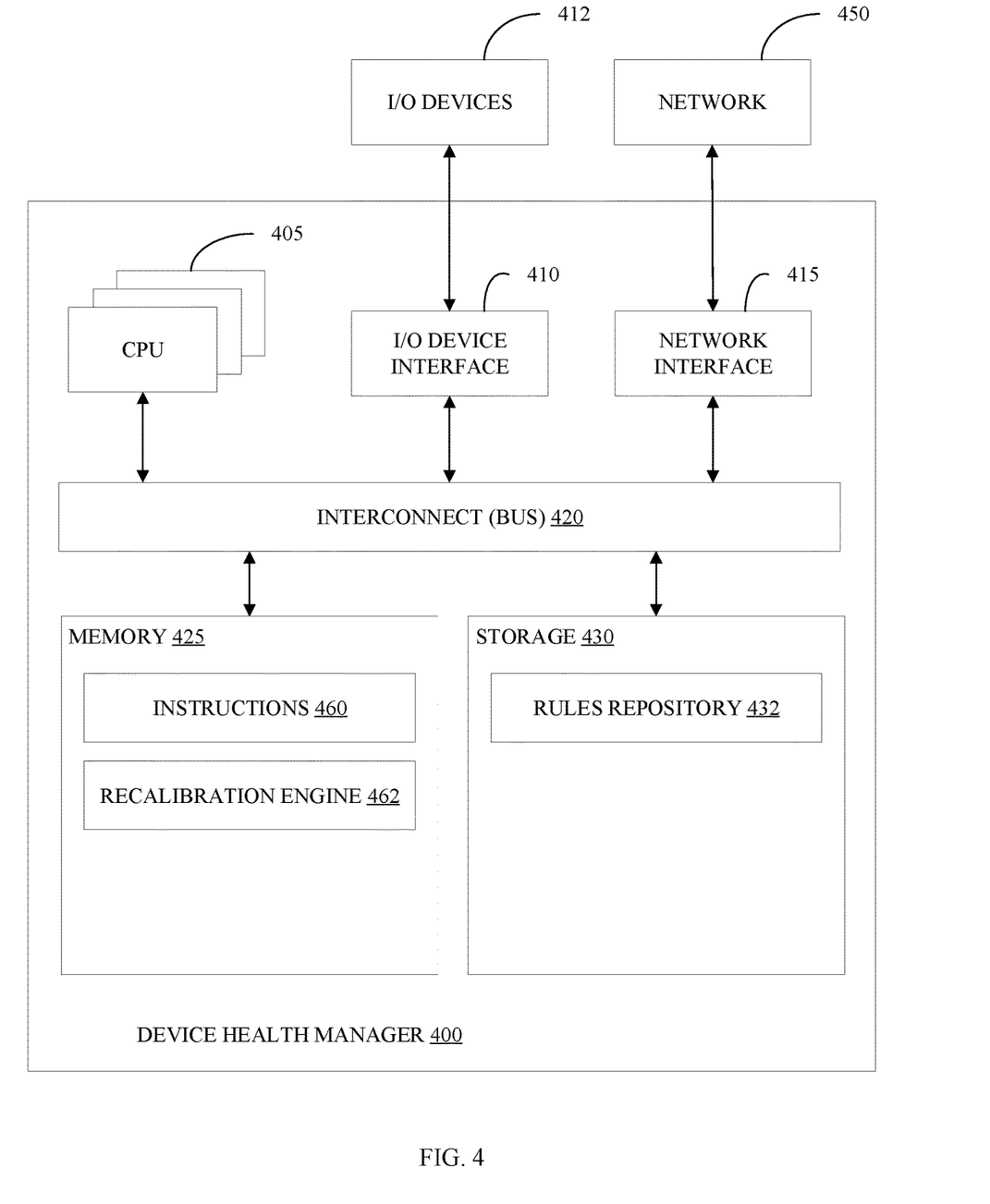
FIG. 4 illustrates a block diagram of an example device health manager, in accordance with some embodiments of the present disclosure.

FIG. 4 illustrates a block diagram of an example device health manager 400 in accordance with some embodiments of the present disclosure. In some embodiments, device health manager 400 can be consistent with device health manager 105 of FIG. 1. In some embodiments device health manager 400 can perform the methods 200-300 as described in FIGS. 2-3. In some embodiments, device health manager 400 provides instructions for any of the methods 200-300 of FIGS. 2-3 to a client machine such that the client machine executes the method, or a portion of the method, based on the instructions provided by the device health manager 400.

The device health manager 400 includes a memory 425, storage 430, an interconnect (e.g., BUS) 420, one or more CPUs 405 (also referred to as processors herein), an I/O device interface 410, I/O devices 412, and a network interface 415.

Each CPU 405 retrieves and executes programming instructions stored in the memory 425 or storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in some embodiments. In some embodiments, a CPU 405 can be a digital signal processor (DSP). In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations). Memory 425 is generally included to be representative of a nonvolatile memory, such as a hard disk drive, solid state drive (SSD), removable memory cards, optical storage, or flash memory devices. In an alternative embodiment, the storage 430 can be replaced by storage area-network (SAN) deices, the cloud, or other devices connected to device health manager 400 via the I/O device interface 410 or a network 450 via the network interface 415.

In some embodiments, the memory 425 stores instructions 460 and recalibration engine 462, and the storage 430 stores rules repository 432. However, in some embodiments, the instructions 460, recalibration engine 462, and rules repository 432 are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all of, any of the methods 200-300 of FIGS. 2-3.

Rules repository 432 can be consistent with rules repository 155 of FIG. 1.

Recalibration engine 462 can be consistent with recalibration engine 115 of FIG. 1.

In some embodiments, the I/O devices 412 include an interface capable of presenting information and receiving input. For example, I/O device 412 can present information to a user interacting with device health manager 400 and receive input from the user.

Device health manager 400 is connected to the network 450 via the network interface 415. Network 450 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/act specified in the flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods described with respect to FIGS. 2-3) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various monitored devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
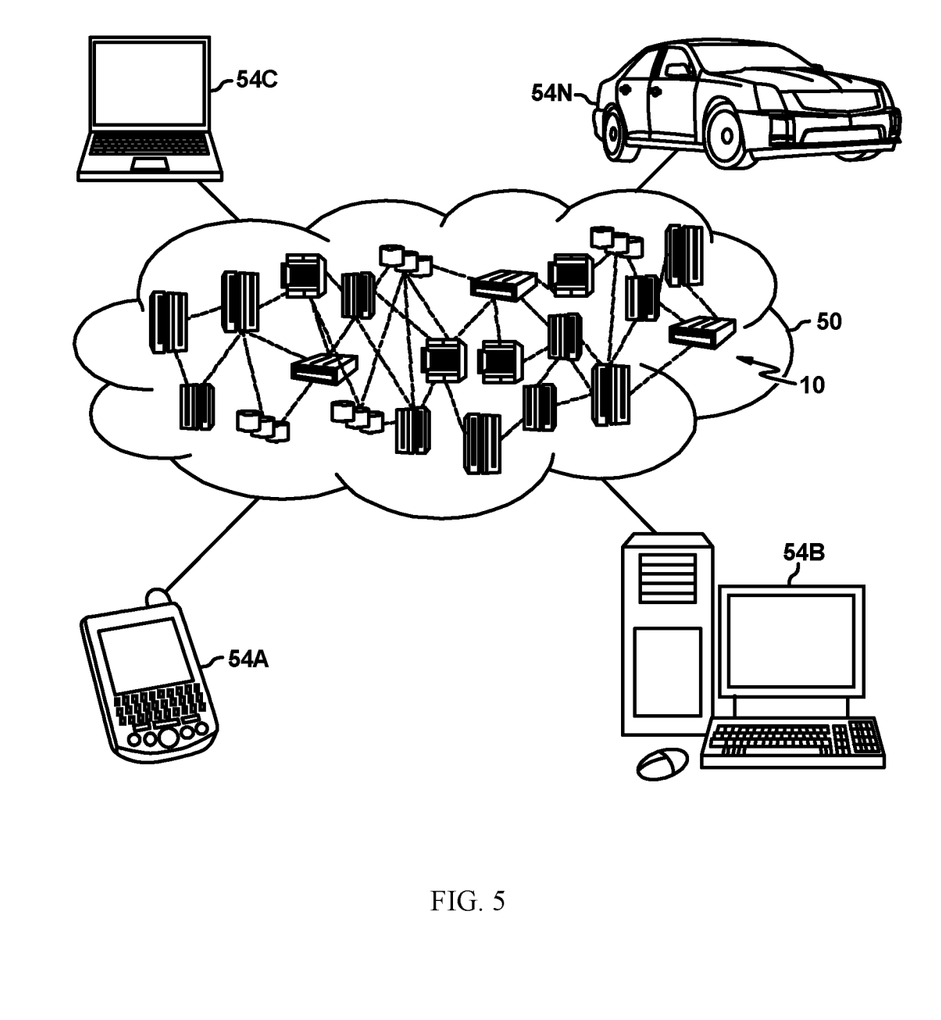
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 6:
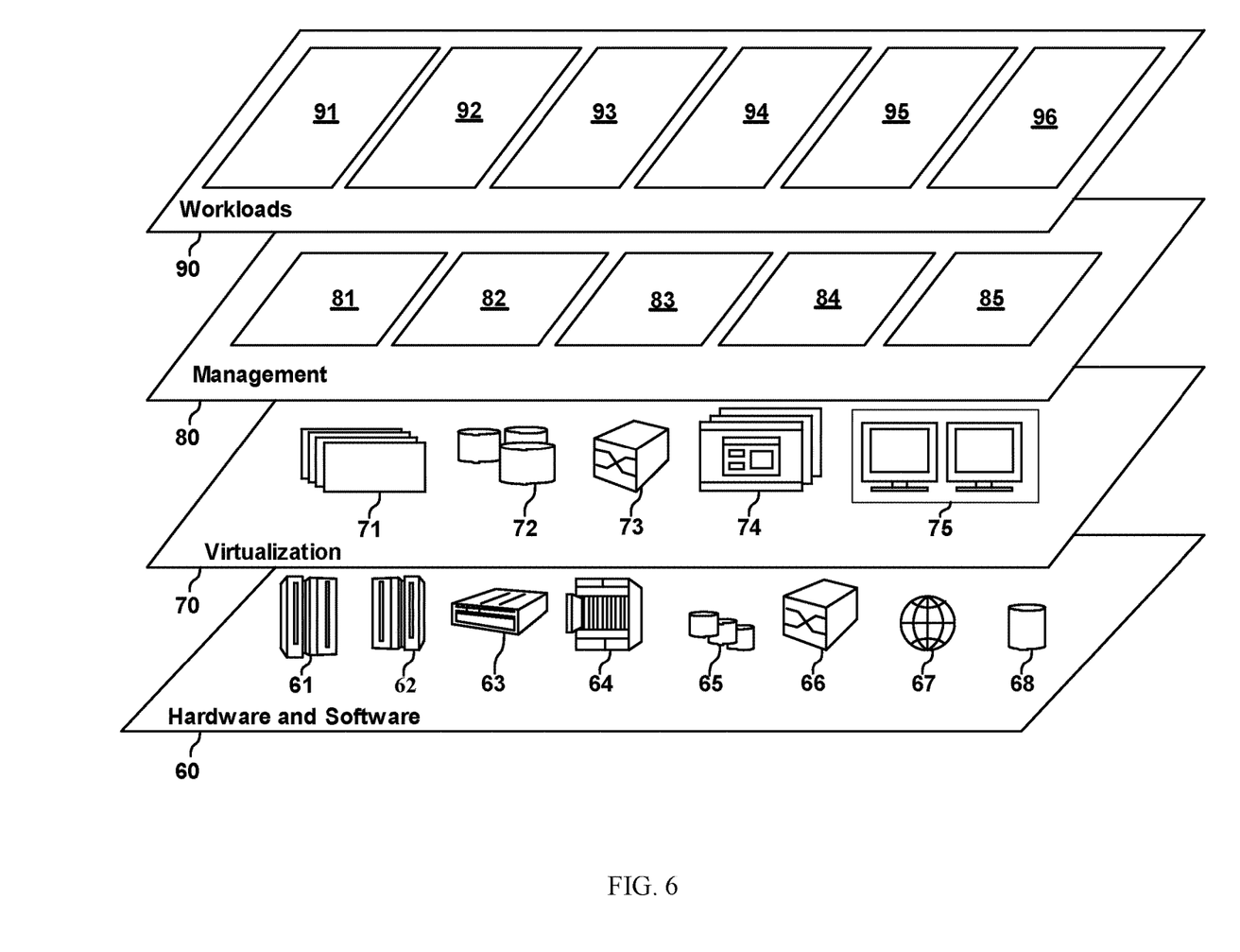
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device health weighting factor analysis.

What is claimed is:

1. A computer-implemented method comprising:
   determining a set of monitored devices, wherein the set of monitored devices includes a first monitored device;
   determining a set of parameters, wherein each parameter is associated with one operating metric of each of the set of monitored devices;
   receiving a set of usage data, wherein the set of usage data includes a usage history for said each parameter;

performing trend analysis on the set of usage data, wherein the trend analysis is configured to identify a relative influence of said each parameter on the set of monitored devices;

generating a set of weighting factors, wherein the weighting factors are based on the trend analysis, and wherein each parameter in the set of parameters is associated with a weighting factor in the set of weighting factors;

calculating a health score for the first monitored device, wherein the calculation is based on the set of weighting factors; and sending the health score for the first monitored device to a maintenance entity.

2. The computer-implemented method of claim 1, further comprising:

continuously monitoring said each parameter, wherein the monitoring is performed by an agent in the first monitored device.

3. The computer implemented method of claim 1, wherein the set of usage data is received from an issue log.

4. The computer-implemented method of claim 1, wherein the method is performed by a device health manager executing program instructions, and wherein the program instructions are downloaded from a remote data processing system.

5. The computer-implemented method of claim 1, wherein the set of monitored devices is based on a manufacturer, a model, and an operating system.

6. The computer-implemented method of claim 1, wherein the set of parameters comprises processor utilization, memory utilization, and disk utilization.

7. The computer-implemented method of claim 1, wherein the generating the set of weighting factors is further based on a current weighting factor.

8. The computer-implemented method of claim 1 further comprising:

determining that the health score is above a high setpoint; and extending an end of life date for the first monitored device.

9. The computer-implemented method of claim 1 further comprising:

determining that the health score is below a low setpoint; and reducing an end of life date for the first monitored device.

10. The computer-implemented method of claim 1, wherein the receiving the set of usage data is in response to recognizing an issue with the first monitored device.

11. A system comprising:

a processor; and a computer-readable storage medium communicatively coupled to the processor and storing program instructions which, when executed by the processor, are configured to cause the processor to:

determine a set of monitored devices, wherein the set of monitored devices includes a first monitored device;

determine a set of parameters, wherein each parameter is associated with one operating metric of each of the set of monitored devices;

receive a set of usage data, wherein the set of usage data includes a usage history for said each parameter;

perform trend analysis on the set of usage data, wherein the trend analysis is configured to identify a relative influence of said each parameter on the set of monitored devices;

generate a set of weighting factors, wherein the weighting factors are based on the trend analysis, and wherein said each parameter in the set of parameters is associated with a weighting factor in the set of weighting factors;

calculate a health score for the first monitored device, wherein the calculation is based on the set of weighting factor; and send the health score for the first monitored device to a maintenance entity.

12. The system of claim 11, wherein the program instructions are further configured to cause the processor to perform the method further comprising:

continuously monitoring said each parameter, wherein the monitoring is performed by an agent in the first monitored device.

13. The system of claim 11, wherein the set of usage data is received from an issue log.

14. The system of claim 11, wherein the program instructions are further configured to cause the processor to:

determine that the health score is above a high setpoint; and extend an end of life date for the first monitored device.

15. The system of claim 11, wherein the program instructions are further configured to cause the processor to perform operations further comprising:

determine that the health score is below a low setpoint; and reduce an end of life date for the first monitored device.

16. A computer program product, the computer program product comprising a non-transitory computer readable storage medium having program instructions embodied therewith, the program instructions executable by a processing unit to cause the processing unit to perform a method comprising:

determine a set of monitored devices, wherein the set of monitored devices includes a first monitored device;

determine a set of parameters, wherein each parameter is associated with one operating metric of each of the set of monitored devices;

receive a set of usage data, wherein the set of usage data includes a usage history for each parameter;

perform trend analysis on the set of usage data, wherein the trend analysis is configured to identify a relative influence of each parameter on the set of monitored devices;

generate a set of weighting factors, wherein the weighting factors are based on the trend analysis, and wherein each parameter in the set of parameters is associated with a weighting factor;

calculate a health score for the first monitored device, wherein the calculation is based on the set of weighting factor; and send the health score for the first monitored device to a maintenance entity.

17. The computer program product of claim of claim 16, wherein the program instructions are further configured to cause the processing unit to perform a method further comprising:

continuously monitor said each parameter, wherein the monitoring is performed by an agent in the first monitored device.

18. The computer program product of claim 16, wherein the set of usage data is received from an issue log.

19. The computer program product of claim of claim 16, wherein the program instructions are further configured to cause the processing unit to perform a method further comprising:

determine that the health score is above a high setpoint; and extend an end of life date for the first monitored device.

20. The computer program product of claim of claim 16, wherein the program instructions are further configured to cause the processing unit to perform a method further comprising:

determine that the health score is below a low setpoint; and reduce an end of life date for the first monitored device.

* * * * *